United States Patent Office 3,248,232
Patented Apr. 26, 1966

3,248,232
METHOD OF COATING FROZEN MEATS
Richard M. Krajewski, Midland, Mich., assignor to The Dow Chemical Company, Midland, Mich., a corporation of Delaware
No Drawing. Filed Sept. 16, 1963, Ser. No. 309,288
9 Claims. (Cl. 99—194)

This application is a continuation-in-part of U.S. Serial No. 149,538, filed November 2, 1961, and now abandoned.

This invention relates to a method of prime coating the exposed surfaces of frozen meats with an edible, solidifiable, barrier composition. More particularly, the invention concerns the provision of such an edible barrier coating film disposed between the exposed surfaces of frozen cuts of meat or meat products and an exterior, protective casing of a moisture-impervious, organic, thermoplastic, resinous packaging material.

It is know in the art of food preservation by freezing, to coat meat products with a glaze of water in order to maintain the original texture, taste and quality of the meat under freezing conditions when the products are to undergo prolonged freezer storage. To accomplish this, an ice glaze or film of ⅛ inch thickness or more is required. Lesser thicknesses of ice film have proven insufficient for protection of frozen meat for periods of more than three months. The known ice glazing process of applying a thickness of between ⅛ and ½ inch requires repeated spray coatings of water, a costly, time-consuming process.

Another method of frozen meat preservation teaches that an ice glaze barrier is formed of the natural juices from the frozen meat upon application (e.g. dipping or spraying) of molten polyethylene. Experience in the art of hot-melt coating techniques substantiates the knowledge that polyethylene cannot be readily applied by means of conventional spraying methods unless the viscosity (a function of the molecular weight of the polymer) is substantially reduced to a degree closely approximating that of paraffin wax. This attempted adjustment of the molecular weight of that polymeric material not only results in the production of a hazy coating, but generally the hardened coating becomes brittle and dissatisfactory at low freezer temperatures. When polyethylene coatings are applied by means of conventional dipping methods, invariably the coating formed on a previously frozen cut of meat or meat product is frequently too thick to be considered economically practical.

Additional known methods of meat preservation include the coating of frozen cuts of meat and meat products with hot-melt coating compositions principally composed of such organic, polymeric, film-forming, resinous materials as polyvinyl chloride, Saran, ethyl cellulose, polyethylene, polypropylene, cellulose acetate, cellulose acetate butyrate, and the like. Ordinarily, those hot-melt coating compositions contain a sizable quantity of oleaginous additive materials incorporated therein as plasticizing, flexibilizing, film-preserving agents and the like. For most ordinary frozen meat preservation purposes, those coating compositions (particularly ethyl cellulose hot-melt coating compositions) which easily form a thin, tough, transparent, peelable, low-temperature flexible, tightly-adhering envelope about the meat product have been satisfactorily utilized. However, one major difficulty experienced in the use of those hot-melt meat coating compositions has been excessive transmission and absorption of the oleaginous components and other additaments included in those resinous coating compositions which permeate and adulterate, in particular, the fatty portions of the package meat products after prolonged freezer storage. This oil-leaching phenomenon generally occurs especially during the thawing operation prior to use. This difficulty is particularly acute in meat products containing fatty tissue which have a low liquefication or melting range.

Discovery is made that a thin continuous solidifiable, edible barrier coating film, one which may become part of the meat product, will appreciably reduce the amounts of plasticizing components that tend to migrate into the fatty tissue of the meat product from the outer, oleaginous-plastified, organic, thermoplastic, resinous, film-forming packaging compositions which are frequently effectively applied in the molten state. Likewise, the same efficacious results can be obtained by application of the edible barrier coating films of the invention when organic, thermoplastic, resinous, heat-shrinkable packaging films containing oleaginous additaments, such as plasticizers and the like, are employed. Advantageously, the successful application of from about 3 to about 10 mil continuous coatings of certain particular aqueous, barrier solutions will reduce the oleaginous additive migration more than 80 percent. Thus, this relatively minor amount of solidified barrier film not only serves as a means of preserving the color, flavor, moisture and texture of the treated frozen meat products, but, at the same time, the film acts as a barrier to prevent excessive amounts of edible additaments, particularly oleaginous plasticizers (included in the majority of organic, thermoplastic, film-forming, resinous food packaging compositions), from migration and ultimate absorption into the fatty tissue of the cut of meat or meat product. In addition, the barrier film provided by the edible barrier coating compositions of the invention does not tend to dissolve or redisperse when solidified on the meat surface because the exterior organic, thermoplastic, resinous packaging films are generally substantially moisture impervious.

Accordingly, it is an object of the present invention to provide a variety of film-forming, clear, transparent, thin, adherent, edible, solidifiable, barrier coating compositions to be applied directly to all exposed surfaces of frozen cuts of meat and meat products prior to the application of an exterior, oleaginous-plastified, organic, thermoplastic, resinous top coating or packaging film.

Another object of the invention is to provide solidified films of a variety of edible barrier coating substances which will substantially reduce the amounts of additives, particularly oleaginous plasticizers that tend to be leached and transmitted from outer, plastified, resinous, top coating packaging films to adulterate the fatty tissue disposed haphazardly over the surface of such packaged meat products.

A further object of the invention is to provide organic, resinous, thermoplastic, coated frozen cuts of meat which are protected against toughening and deterioration generally caused by loss of moisture and oxidation.

An additional object of the invention is to provide frozen cuts of meat and meat products packaged in clear, transparent films of organic, thermoplastic, resinous compositions having an eye-appealing appearance to the consumer which appearance is not appreciably diminished during the normal thawing operation required prior to use.

These and further objects and advantages, which will become apparent from the ensuing description, are accomplished by the invention, which briefly comprises a method of packaging cuts of meat and meat products, for the purpose of shielding the same against adulteration provided by extractable oleaginous additive materials which are leached from organic, thermoplastic, resinous, packaging films enveloping the same, said method comprising the steps: (1) freezing the meat (i.e. steaks, roasts, chops and ground portions of beef, pork and lamb, as well as dressed fowl whole or sectioned); (2) applying thereon a prime edible barrier coating composition as a thin continuous film covering the exposed surfaces of said frozen meat, said barrier coating composition being solidifiable at the temperature of the surface of the frozen meat at the time of application thereon; (3) solidifying said continuous coating film; and (4) enveloping said frozen, barrier-coated meat in at least one layer of a protective outer casing composed of a film-forming suitably-adherent, moisture-impervious, organic, thermoplastic, resinous composition.

Suitable edible, solidifiable substances that may be employed in the preparation of the prime barrier coating compositions used so advantageously in the process of the invention include (a) aqueous solutions of mixtures of polyglycols (e.g. polyethylene glycols having an average molecular weight from about 200 to about 20,000); (b) water-soluble, solidifiable, natural materials, such as natural gums (e.g. gum acacia, gum karaya, locust bean gum, gum tragacanth, and the like); carbohydrates (e.g. corn starch, dextran, potato starch, tapioca starch, and the like); and (c) water-soluble, solidifiable, synthetic materials, such as synthetic cellulose ethers (e.g. methylcellulose ether, sodium salt of carboxymethylcellulose ether, hydroxypropylmethylcellulose ethers, hydroxyethylcellulose ethers, and the like, as well as mixtures of the foregoing as described hereinafter); (d) various surface-active agents or wetting agents (e.g. sodium oleate, sodium stearate, polyoxyethylene sorbitan monooleate, obtained as "Tween 80" and polyoxyethylene sorbitan monolaurate, obtained as "Tween 20"); (e) high melting organo-soluble fats (e.g. tristearin, triolein, glyceryl monostearate, and the like); and (f) synthetic hydrophilic colloids (e.g. the propylene glycol partial ester of alginic acid, obtained as "Kelcoloid LVF," pectinic acid amide, and the like).

However, the preferred, film-forming, edible, solidifiable materials useful as prime barrier coating compositions of the invention are aqueous solutions containing one of the following materials:

BARRIER MATERIALS

Tapioca starch.
Corn starch.
Sodium oleate.
Sodium stearate.
Pectinic acid amide having a methoxyl content of from 3.5 to 5%.
Sodium salt of carboxymethylcellulose ether having a degree of cellulose hydroxy substitution of from 0.65 to 0.95, a viscosity as a 2% aqueous solution at 25° C. of from 300 to 600 centipoises and a moisture content of 5% maximum.
Hydroxyethylcellulose ether having a degree of cellulose hydroxy substitution of from 0.8 to 0.9, a molar substitution (that is, moles of ethylene oxide residue present per 3 available hydroxyl groups) of from 1.3 to 1.4, a viscosity as a 2 percent aqueous solution at 25° C. of from 3500 to 5000 centipoises, a water content of 5% maximum, and an ash content of 6% maximum.
Propylene glycol partial ester of alginic acid, obtained as "Kelcoloid LVF," having a pH as a 1% aqueous solution at 25° C. of ca. 4, and a viscosity at 25° C. of 120 centipoises as a 1% aqueous solution, 1200 centipoises as a 2% aqueous solution, and 6000 centipoises as a 3% aqueous solution.
Methylcellulose ether having an average methoxyl content of from 27.5 to 32% and an average viscosity of about 5000 centipoises as determined on a 2 wt. percent aqueous solution at 20° C.
Composition E containing about 4 wt. percent of methylcellulose ether having an average methoxyl content of from 27.5 to 32% and an average viscosity of about 15 centipoises as determined on a 2 wt. percent aqueous solution at 20° C., about 8 wt. percent of polyethylene glycol having an average molecular weight of about 9000, and about 88 wt. percent of water.
Composition F containing about 4 wt. percent of methylcellulose ether having an average methoxyl content of from 27.5 to 32% and an average viscosity of about 15 centipoises as determined on a 2 wt. percent aqueous solution at 20° C., about 8 wt. percent of polyethylene glycol having an average molecular weight of about 12,000, and about 88 wt. percent of water.
Hydroxypropylmethylcellulose ether having a methoxyl content of from 27 to 29% and an average hydroxypropoxyl content of from 4 to 7%.
Hydroxypropylmethylcellulose ether having a methoxyl content of 19 to 24% and an average hydroxypropoxyl content of from 4 to 12%.

Beneficial results are obtained when a continuous coating containing as little as about 0.6 percent by weight, as based on the total weight of the frozen cut of meat, of prime barrier coating composition of the invention is applied (or about 2 mil continuous film). The thickness of the solidified continuous barrier coat required is generally dependent on the fat content of the meat, length of thaw time, and the size of the meat cut. Thus, a preferred range of from about 0.1 to 1.5 percent by weight or an approximate 0.3 to 3.25 mils continuous film of prime barrier coating substance is desirable if the packaged barrier-coated frozen meat is allowed to thaw no longer than about 2.0 hours. The application of larger amounts of the prime oil-barrier coating is only limited by the cost of application. Consequently, an oil-barrier coating of up to about 10.0 mils average thickness can be required if the anticipated thaw time were to approach about 5.0 hours.

Satisfactorily utilized as clear, transparent outer protective casing materials and packaging films for application over the prime oil-barrier coated cuts of meat and meat products, by the method of the present invention, are known organic, thermoplastic, resinous coating compositions containing extractable additive materials, such as oleaginous plasticizers, which provide thin, tough, transparent, peelable, adherent films. These coating compositions and methods for applying the same are clearly described in United States Letters Patents 2,840,474, 2,840,475, 2,840,476, 2,868,656 and 2,909,434. Although the coating compositions described in these patents cover coatings containing as the film-forming ingredient polyvinyl chloride and water-insoluble ethyl cellulose, any other organic, thermoplastic coating formulation (suitably employed for enveloping foodstuffs) is included which contains extractable oleaginous additaments and is capable of being formed into a continuous, moisture-impervious package in intimate contact with the frozen meat, such as polyethylene and polypropylene hot-melt coating formulations.

Before coating the surfaces of the frozen cuts of meat or meat products, it is most advantageous if the body temperature of the meat closely approximates a temperature of at least —10° C. and preferably below —20° C. in order to assure instantaneous solification of the edible barrier coating composition to form a thin, continuous film. Although improvements in the prevention of oleaginous additive migration into the fatty tissue naturally distributed on the surface of stored frozen meat products has been noted even at a meat surface temperature of about −3° C. (26.6° F.), this higher temperature has a tendency to retard cohesive, solidifying action of the prime barrier coating sufficiently so that droplets of the coating substance are formed resulting in a discontinuous film. In such instance, an additional quantity of the barrier coating composition is required in order to produce satisfactory results.

The desired thin, continuous, edible, barrier undercoating films are attained most efficiently and effectively when atomized spraying techniques are employed. However, other methods of application of the coating solutions may be used such as dipping or doctoring. The method of application is primarily determined by the viscosity of the barrier composition being applied.

The temperature of the barrier coating solutions at the time of application is not particularly critical. The barrier coating solutions employed in the packaging method of the present invention at temperatures below ambient are generally satisfactory. Advantageous results are usually obtained when the application temperature of the barrier coating solution is maintained within the range of from 20° to 60° C. under normal atmospheric conditions.

Solidified, continuous films of the barrier-coating compositions of the present invention enhance considerably the eye-appealing characteristics of the frozen cuts and meat products which they enclose, by their generally crystal clear, transparent coloration. Such solidified, continuous, barrier films readily adhere to the outer continuous, thermoplastic, resinous, packaging film as it is peeled off the frozen meat when shorter periods of thawing are observed and, consequently, the barrier coating compositions have no appreciable effect on the taste or cookability of such packaged meat products. The surfaces of cuts of meat protectively packaged by the method of the present invention, when allowed to thaw while encased for from 2 to about 5 hours, may have a tendency to feel slightly slippery when stripped of the outer thermoplastic packaging film due to the adherence thereto of the solidified prime barrier coating film. The packaging systems of the invention which comprise a solidified undercoating of any one of the novel, oil-barrier coating compositions and an overcoating (i.e. an outermost envelope) of any one of the protective outer organic, thermoplastic, resinous casings in no way adversely affect the initial flavor, texture and other desirable characteristics of the meat product. Rather, the frozen meat packaging methods of the instant invention serve to better preserve and protect the fresh meat properties so preferred by the consumer.

According to the preferred frozen meat packaging procedure of the invention, the cut of meat or meat product, whether a solid body or chunks of molded pieces or in a ground condition, is first blast frozen by suspending the same in a blast of air cooled to a temperature within the range of at least below −10° C. and preferably below −20° C., and most generally in the range of about −20° to −50° C. until at least the outer surface of the meat is sealed by being hard frozen. It will be understood, as noted above, that whether the entire body of the meat or only the outer surface is frozen will be governed by the economics of continuous handling of the type of meat cut, particularly considering the size of the cut of meat and the time needed to penetrate the body of the meat for complete freezing. Whether the process is to be practiced in a continuous packaging system, that is, moving the meat on conveyors from one stage to the next, the timing required for each stage will determine the amount of time available for complete or only partial freezing. However, the colder the surface and body of the cut of meat prior to the barrier coating operation, the more rapidly the prime barrier coating film becomes firm. A thin prime barrier coating, forming a continuous film which completely separates the exterior surface of the cut of meat from the outer casing, i.e. the outer layer of enveloping film formed of an organic, thermoplastic, resinous coating composition, is necessary for attainment of completely satisfactory results.

In a continuous system, to which the present method is well adapted, the meat moving continuously is moved generally on a conveyor to treating station, automatically or manually weighed and simultaneously priced for retail sale whereby the weight and price may be immediately printed by an automatic weigher-pricer machine, as is commercially available.

The frozen meat, after weighing and pricing, is labeled with a water-wet label which instantly adheres to the meat without further adhesive. Then the labeled meat is given an atomized spray application of the prime barrier coating composition, as previously described. Immediately thereafter, the meat is conveyed to a refrigerated chamber maintained below −30° C., which may be merely static refrigeration or further treated in a blast freeze as may be convenient, to again refrigerate the meat and restore its initial cold body temperature. Thereafter, the meat is ready for the outer casing or exterior packaging by at least one dip, spray, or brush coating of an organic, thermoplastic, resinous, film-forming, hot-melt coating composition, or by enveloping the frozen meat in individual heat-shrinkable, heat-sealable containers produced from suitable axially oriented thermoplastic, resinous films.

*Example 1*

For purposes of comparison, the following hot-melt, resinous coating composition was prepared containing these ingredients:

ETHYL CELLULOSE HOT-MELT COATING COMPOSITION I

| Ingredients: | Weight percent |
|---|---|
| Ethyl cellulose (20 cps.)[1] | 29.85 |
| Mineral oil [2] | 51.00 |
| Butyl phthalyl butyl glycolate [3] | 10.00 |
| Acetyl tributyl citrate [4] | 7.00 |
| Epoxidized soyabean oil [5] | 2.00 |
| Citric acid (USP) | 0.14 |
| Butylated hydroxyanisole | 0.01 |

[1] "Ethocel," 20 c.p.s., standard.
[2] L. Sonneborn and Sons L–1 grade mineral oil.
[3] "Santicizer B–16."
[4] "Citroflex A–4."
[5] "Paraplex G–62."

This holt-melt coating composition was heated in a unit capable of projecting a continuous film of the molten composition at about 315°±10° F. Meat products, such as U.S. choice steaks, roasts, and chops of beef, were quick frozen and maintained in a freezer at a temperature less than about −30° C. Subsequently, these cuts of frozen meat were coated with this hot-melt composition and replaced in a freezer then was held at a temperature of approximately −20° C. for about 24 hours. Thereafter, the meat was analyzed for its mineral oil content by an A.O.A.C. modification method as described in detail hereinafter. The analyses were conducted on meat samples which were allowed to thaw at about 75° F. for about 30 minutes before stripping off the encasing film of the cured ethylcellulose coating.

A similar set of meat sample was glazed with a thin layer of water by playing an atomized spray over the frozen meat products before coating the same with the hot ethylcellulose melt composition. The water before spraying was at a temperature near freezing and the surface of the cuts of meat was approximately −30° C. (−22° F.). This enabled a film of ice to form instantaneously over the entire surface of the meat. The temperature of the water and the temperature of the meat surface, as indicated above, were necessary in order to obtain maximum covering results with the least amount of water. The amount of water applied was between about 0.3 and 2.0 percent based on the weight of the piece of meat. The ice-glazed meat was stored in a freezer at a temperature of about −20° C. for at least one hour before coating the same with the hot ethylcellulose melt composition I. Table I shows the average results of oil migration which were obtained after 0.5 hour thawing time at room temperature.

TABLE I.—PLASTICIZER MIGRATION INTO MEAT COATED WITH ETHYL CELLULOSE HOT MELT AFTER 0.5 HOUR THAW

| Type of Meat | Plasticizer Migration (Parts Per Million) | | |
| --- | --- | --- | --- |
| | Control | Water Treated | Percent Difference |
| Beef hamburg | 240 | 70 | −70 |
| Beef steak | 160 | 40 | −75 |
| Pork roast | 135 | 60 | −55 |
| Pork chop | 200 | 40 | −80 |
| Lamb roast | 150 | 35 | −75 |

*Example II*

The ethylcellulose coating composition of Example I was cast from a hot-melt to produce a film of about 50 mils in thickness and cut to form a test sample of about 2.25 inches in diameter. This film was wiped clean with soft tissue paper. A sample of frozen beef fat was laid on the test film and another piece of the same film was placed on top of the fat. Finally, a piece of plate glass, as a weight, was placed on top of the uppermost film to keep the top film in even close contact with the top surface of the fat.

The fat specimen was prepared by grinding choice, outer beef fat and pressing the ground fat into a shaped patty approximately 0.75 inch by 2.25 inches in diameter. Subsequently, the fat specimen was frozen to a temperature of about −20° F. (about −29° C.).

The sandwich of fat between two layers of wiped or cleansed ethylcellulose coating film was allowed to condition at room temperature for about 2 hours before the films were removed and the fat analyzed for the presence of mineral oil.

This experimental procedure, as described above, was repeated except the surface of a shaped patty of beef fat was coated with ice water by atomized spray.

Another specimen of fat was spray coated with a cold aqueous solution of Formula B as shown in Table II which follows. The solution contained about 1.34 parts of hydroxypropylmethylcellulose ether having an average viscosity of about 400 centipoises, about 20.10 parts of hydroxypropylsucrose monopalmitate, about 7.48 parts of hydroxypropylsucrose and about 71.0 parts of water.

TABLE II

| Barrier Compositions Ingredients | Formulations | | | |
| --- | --- | --- | --- | --- |
| | A | B | C | D |
| Hydroxypropylmethylcellulose ether (400 cps.)[1] | | 1.34 | | |
| Hydroxypropylsucrose monopalmitate[2] | | 20.10 | | |
| Hydroxypropylsucrose[3] | | 7.48 | | |
| Water | 100 | 71.00 | 99 | 99.5 |
| Corn starch | | | 1 | |
| Hydroxypropylmethylcellulose ethers (15,000 cps.)[4] | | | | 0.5 |

[1] "Methocel 65 HG" having an average ethoxyl content of from 27 to 29% and an average hydroxypropoxyl content of from 4 to 7.5%.
[2] "Hyprose SP-80 monopalmitate".
[3] "Hyprose SP-80".
[4] "Methocel 90 HG" having an average methoxyl content of 19 to 24% and an average hydroxypropoxyl content of from 4 to 12%.

As shown also in Table II, other individual patties of ground fat each was treated with cold one percent solutions of one of the following materials: corn starch and high viscosity grade of hydroxypropylmethylcellulose ether having an average methoxyl content of between about 19 and 24 percent and an average hydroxypropoxyl content of from 4 to 12 percent.

The surface temperature of each fat specimen was reduced to about −20° F. prior to the atomized spray application of each different cold barrier coating solution. The maintenance of the aforementioned temperature conditions caused a substantially uniform continuous solidified glaze coating over the entire surface. The results of these barrier coating efficiency tests are recorded in Table III which follows.

As shown by the test results, a considerable and advantageous reduction in the amount of oil plasticizer migrating into the meat is achieved by means of applying a thin prime barrier coating of ice or film-forming aqueous solutions of polyols. Similar plasticizer migration tests were made employing cold aqueous solutions of corn starch, sodium oleate, sodium stearate and a high viscosity grade hydroxypropylmethylcellulose ethers having an average methoxyl content of from 19 to 24 percent and an average hydroxypropoxyl content of from 4 to 12 percent with similar beneficial results.

TABLE III.—PLASTICIZER CONTENT OF FROZEN BEEF FAT IN CONTACT WITH ETHYLCELLULOSE MELT COATING FOR TWO HOURS

| Barrier Composition | Barrier Thickness (mils) | Plasticizer Intake (p.p.m.) | Percent Change |
| --- | --- | --- | --- |
| SERIES A | | | |
| Control (no barrier) | 0 | 1,340 | 0 |
| Ice glaze | 2.25 | 750 | −44 |
| Hydroxypropylmethylcellulose ether composition [1] | 0.45 | 1,150 | −14 |
| Do.[1] | 1.35 | 1,075 | −20 |
| Do.[1] | 2.25 | 700 | −48 |
| Do.[1] | 3.15 | 240 | −82 |
| SERIES B | | | |
| Control (no barrier) | 0 | 800 | 0 |
| Corn starch | 2.25 | 485 | −40 |
| Hydroxypropylmethylcellulose ether (15,000 cps.) [1] | 2.25 | 350 | −56 |

[1] See Table II, Formulation B, for percentage composition of barrier coating compositions employed.

*Example III*

To determine the effect of thawing time on the amount of oleaginous plasticizer absorbed by meat samples from the closely-adhering, continuous, organic, thermoplastic, resinous packaging film enclosing the same, samples of three types of beef products were frozen solid and dip coated in a melt of the ethylcellulose coating composition I of Example I.

The types of beef products employed in these tests included: Group A, 100 percent ground beef fat; Group B, ground beef having a fat content of approximately 30 percent; and Group C, beef loin steaks having a fat content between about 20 to about 40 percent.

*Group A.*—Twenty-four 50 gram samples of beef fat were blast frozen until they became solid and attained a body temperature within the range of about −25° C. to about −50° C. Thereafter, the frozen fat samples were given one coat of ethylcellulose coating composition I, previously described, by means of dipping the samples into the molten composition. The coating composition solidified rapidly and formed a continuous, closely-adhering, moisture impervious film enveloping the various irregular contours of the chunks of beef fat.

To determine the effect of thawing time on the amount of mineral oil plasticizer migrating from the packaging film into the fat samples, three samples were stripped of the enveloping films immediately after the films had solidified. An improved adaptation of the Association of Official Agricultural Chemists' Official Method of Analysis, 8th edition, 1955, page 64, as described hereinafter, and designated as A.O.A.C. Modification, Method B, was employed. Results of the analysis showed that an average of 42 parts per million (p.p.m.) of mineral oil had been absorbed by the beef fat samples in the comparatively short time required to set or solidify and subsequently strip the coating composition from the samples of beef fat.

A set of six melt-coated samples was allowed to thaw for about one-half hour at a temperature of about 75° F. After removing the resinous coating film from the six beef fat samples and analyzing the same for absorbed plasticizer, it was determined that half of these samples had absorbed an average of about 2020 p.p.m of mineral oil and the remainder of the set of six samples had absorbed an average of approximately 2260 p.p.m. of the oil.

Another set of fifteen melt-coated fat samples was thawed for about 2 hours in a chamber maintained at about 75° F. Analysis of this group of samples, following removal of the solidified resinous melt coating encasing each sample, produced average values ranging up to a high figure of 4020 p.p.m. for the amounts of mineral oil plasticizer absorbed by these samples of beef fat.

*Group B.*—Employing procedures of Group A, fourteen 200 gram samples of ground beef having a fat content of approximately 30 percent were frozen and coated with the same ethylcellulose hot-melt coating composition I (Example I). One set of these samples was stripped of the solidified resinous packaging film after a thawing period of one-half hour, while a second set was opened after thawing for about 2.5 hours and a third set was unpackaged in preparation for analysis of plasticizer oil content after a thawing period of about 5.0 hours.

Results of analysis of seven samples that had thawed for one-half hour produced average values of 158 p.p.m. for the least amount of absorbed oil plasticizer and 211 p.p.m. was the average high absorption value determined. The three samples that thawed for 2.5 hours were shown by analysis to have absorbed an average of 281 p.p.m. of the plasticizing agents. The four samples with the longest thawing period of 5 hours showed average oil absorption values ranging from 742 p.p.m. to 986 p.p.m. as determined from computations made from results of the analytical data obtained.

*Group C.*—Four completely frozen beef loin steaks having a fat content between about 20 to about 40 percent were spray coated with one coat of the ethylcellulose coating composition I of Example I. Two of the frozen coated steaks were thawed for about one-half hour in a chamber maintained at about 75° F. and the two other steaks were allowed to thaw for about 2.0 hours under the same atmospheric conditions. When the two stipulated thawing periods had elapsed, each steak was stripped of its tough, rubbery ethylcellulose coating and subsequently analyzed for mineral oil plasticizer content employing the new adaptation of the A.O.A.C. Modification, Method B, a detailed description of which follows. Mineral oil absorption values of 201 and 213 p.p.m. were established for the steaks that had thawed in direct contact with the cured oil plasticized coating composition for one-half hour and an average oil absorption of about 465 p.p.m. was determined by analysis as the intake of oil plasticizer by the steaks that were permitted to thaw about 2 hours.

MODIFICATION OF A.O.A.C. OFFICIAL METHOD OF ANALYSIS—METHOD B—DETERMINATION OF MINERAL OIL IN BEEF (1) Scope:

The following procedure is suitable for determining 0–800 p.p.m. of mineral oil in beef (Note 7a). The accuracy of the method is ±5 percent over this range.

(2) Principle:

The meat is saponified in an alcoholic potassium hydroxide solution. The saponification mixture is extracted with petroleum ether. The unsaponifiable fraction from the ether extract is treated with sulfuric acid in a modified milk-testing bottle. The unreacted residue is calculated as mineral oil.

(3) Reagents:

(*a*) Ethanol, 2B or Formula 30, absolute. See Note 7*b*.
(*b*) Petroleum ether, boiling point 30–60° C. See Note 7*b*.
(*c*) Potassium hydroxide, analytical reagent grade pellets.
(*d*) Sulfuric acid, concentrated, reagent grade.
(*e*) Solvent A: Mix exactly 500 ml. of water with 600 ml. of ethanol.

(4) Apparatus:

(*a*) Hot plate.
(*b*) Hot water or steam bath.
(*c*) Beakers, 1500 ml., 800 ml.
(*d*) Watch glass, 7 inches.
(*e*) Modified Pyrex milk-testing bottle.
(*f*) Centrifuge and accessories. International Chemical Centrifuge or equivalent with head and metal shields for Babcock milk-testing bottles.
(*g*) Syringe, Yale, 5 cc. with 4 inch No. 20 needle.
(*h*) Separatory funnel, 2 liter equipped with Teflon stopcock.
(*i*) Pyrex baking dish, 10″ x 6″ x 2″.

(5) Procedure:

(*a*) The coated samples must be kept frozen until just prior to the analysis.

(*b*) Remove the sample from the freezer and immediately weigh to the nearest gram. Keep the meat at room temperature for 30 minutes. Slit the coating with a knife. Peel the coating off and place the meat in a clean Pyrex dish.

(*c*) Weigh the coating to the nearest gram. Calculate the net weight of the sample by subtracting the weight of the coating from the gross weight.

(*d*) Cut the meat into pieces approximately one to two inches square. If the sample weighs two to three pounds, transfer the meat to a 4 liter beaker. Smaller cuts of meat may be transferred to corresponding smaller beakers.

(*e*) Wash the dish and utensils with two 50 ml. portions of ethanol and transfer the washings to the beaker. Allow the dish to dry and then rinse it with three 25 ml. portions of petroleum ether. Transfer the wash solutions to the beaker. Any solids remaining in the dish may be neglected.

(*f*) Add 100 ml. of ethanol and 60 grams of potassium hydroxide to the beaker for each 250 grams of meat.

(*g*) Cover the beaker with a watch glass and place on a hot plate. Boil the mixture gently for 60 minutes. Swirl the contents frequently to prevent bumping or excessive frothing. Frothing may be decreased by washing down the sides of the beaker with alcohol. Do not leave the sample unattended on the hot plate. Add alcohol occasionally if necessary to compensate for evaporation.

(*h*) After the mixture has boiled for 60 minutes, allow it to cool until most of the insoluble residue has settled out. Transfer about one-half of the supernatant liquor to a tared 4 liter beaker (see paragraph *d*).

(*i*) Add an additional 25 grams of potassium hydroxide, for each 250 grams of meat, to the beaker containing the insoluble residue. Boil the mixture gently for 30 minutes or until all of the fat and meat have disintegrated.

(*j*) Remove the beaker from the hot plate and allow it to stand until the insoluble residue has settled out. Transfer the remaining supernatant liquor to the tared beaker from (*h*). Wash the residue and beaker with three 50 ml. portions of ethanol and then with three 50 ml. portions of petroleum ether, transferring each rinse solution to the beaker. Discard any bone or other residue in the beaker.

(*k*) Add 150 ml. of Solvent A for each 250 grams of original sample to the beaker containing the solution.

(*l*) Weigh the beaker and contents to the nearest gram and then determine the net weight of the mixture. Calculate the amount of the mixture which corresponds to 250 grams of original meat.

Amount proportional to 250 g. =

$$\frac{250 \times \text{net weight of mixture}}{\text{weight of original meat}}$$

(*m*) Place a stirrer in the mixture and stir for ten to fifteen minutes. The rate of stirring must be sufficient to keep all solids in suspension. Immediately transfer an amount approximately equal to the value calculated in (*l*) to a tared 800 ml. beaker. Reweigh the beaker and obtain the net weight of the aliquot.

(*n*) Add 100 ml. of water and 150 ml. of Solvent A to the beaker.

(*o*) Transfer the solution and the sludge to a 2 liter separatory funnel. Rinse the beaker with 300 ml. and then with 500 ml. of Solvent A, transferring the rinse solution and the finely divided residue to the separatory funnel.

(*p*) Rinse the beaker with 300 ml. of petroleum ether. Add the washings to the separatory funnel. Discard any undigested pieces of bone remaining in the beaker.

(*q*) Shake the separatory funnel vigorously for one minute. Allow the layers to separate (ten to fifteen minutes). Transfer the lower aqueous layer to a second separatory funnel. Any interface should be kept with the aqueous layer.

(*r*) Re-extract the aqueous layer with a second 300 ml. portion of petroleum ether. Allow the layers to separate and discard the lower aqueous layer.

(*s*) Combine the petroleum ether layers in one separatory funnel. Rinse the empty funnel with two 50 ml. portions of petroleum ether. Combine the washings with the main petroleum ether fraction.

(*t*) Add 75 ml. of Solvent A to the separatory funnel. Shake thoroughly. Allow the layers to separate (about five minutes) and discard the aqueous layer.

(*u*) Wash the petroleum ether with 75 ml. portions of Solvent A until the washings are alkali-free. The washings may be checked with pH paper or an indicator solution. (Incomplete removal of alkali may result in an indistinct line of demarcation between the mineral oil and the sulfuric acid in the final step.) Make at least two additional washings after the water is neutral.

(*v*) Transfer the petroleum ether to an 800 ml. beaker. Rinse the separatory funnel with two 50 ml. portions of petroleum ether and add the washings to the beaker.

(*w*) Evaporate the solution to a volume of approximately 20 ml. on a steam bath. A stream of nitrogen or air directed on the surface of the liquid will facilitate the evaporation (see Note 7*d*).

(*x*) Transfer the solution to a 100 ml. beaker. Rinse the 800 ml. beaker with four 25 ml. portions of petroleum ether. Transfer the washings to the 100 ml. beaker, evaporating the solution between each addition. Evaporate the petroleum ether to a volume of 5 to 10 ml.

(*y*) Remove the capillary tube from the modified milk-testing bottle and transfer the petroleum ether solution to the bottle. Rinse the beaker with four 5 ml. portions of petroleum ether and add the washings to the bottle.

(*z*) Place the bottle on the steam bath and evaporate dryness. (A stream of nitrogen or air passing through the bottle will facilitate the evaporation.) Continue to heat the bottle for fifteen minutes after the petroleum ether has apparently been removed. Any petroleum ether remaining in the flask will be measured as mineral oil.

(*aa*) Cool the bottle to room temperature. Immerse the bottles in a cold water bath and add 30 ml. of concentrated sulfuric acid. The sulfuric acid should be added slowly with swirling to prevent localized overheating and charring (see Note 7*e*).

(*bb*) Mix the solution and place the bottle in a boiling water bath for 30 minutes. Swirl the solution frequently. Cool the solution to room temperature.

(*cc*) Add sulfuric acid to the bottle until the level is just below the joint. Insert the capillary tube in the bottle.

(*dd*) Add additional sulfuric acid through the capillary, with the syringe, until the fluid level rises about one-half of the way into the graduated capillary. Keep the tip of the syringe just above the liquid level.

(*ee*) Centrifuge the bottle for 15 minutes at 1200 r.p.m. If the clear oil level does not fall within the graduations, add additional acid as above and recentrifuge.

(*ff*) Record the volume of unreacted oil, measuring between the oil-acid interface and the bottom of the oil meniscus.

(6) Calculations:

Let A equal the weight of mixture in the beaker (section 5*m*), B equal the total weight of meat (section 5*c*), C the weight of the total mixture (section 5*l*), and D the volume of unreacted oil expressed in milliliters. Then:

$$\text{P.p.m. mineral oil} = \frac{C \times D}{A \times B} \times 0.87 \times 10^6.$$

(7) Notes:

(*a*) The method has been checked only with beef. Before the method is applied to other types of meat, samples containing known quantities of mineral oil should be carried through the entire procedure.

(*b*) Blank determinations must be carried out on the ethanol and petroleum ether as follows: Evaporate 500 ml. of ethanol and 1000 ml. of petroleum ether to dryness and treat the residues with sulfuric acid as described in 5*y* through 5*ff*. If any unreacted residue is detected, the solvents must be discarded or purified by distillation.

(*c*) All solvents and reagents should be stored in glass containers rather than plastic containers.

(*d*) The air line should contain a trap to prevent contamination of the sample with oil.

(*e*) Full face and eye protection should be worn when heating the bottles containing the sulfuric acid.

*Example IV*

To check both the effect of storage time in the freezer on the amount of mineral oil which would migrate by leaching into frozen meat coated with organic, thermoplastic, resinous coating formulations containing an oleaginous plasticizer and also to determine the efficiency of liquid scintillation extraction and solution methods of radio-carbon analysis as compared to those of wet combustion and gas counting methods of radiocarbon analysis, the following comparative tests were conducted.

Samples of beef fat which had been frozen to a body temperature of about −20° C. were coated with an ethylcellulose coating composition similar to the coating composition of Example I with the radioactive $C^{-14}$ labeled mineral oil plasticizer being included in place of the indicated mineral oil plasticizer. The samples, which were immediately refrozen and then retained in cold storage at temperatures of between about −30° C. and −35° C. for about 5 months, were analyzed by gas counting method of radiocarbon analysis as well as liquid scintillation method of radiocarbon analysis. In addition, comparative results were obtained by means of the two aforementioned methods of radiocarbon analysis on pork fat prepared in the same manner as previously described for the beef fat.

The liquid scintillation method of radiocarbon analysis for the samples of beef fat showed an average radioactive carbon$^{-14}$ mineral oil uptake of 14.8 disintegrations per minute (d.p.m.) per milligram of fat, while the G.-M. tube gas counting method of radiocarbon analysis recorded an average radioactive carbon–14 mineral oil uptake of 15.1 d.p.m. per milligram of fat.

The liquid scintilation method of analysis on pork fat samples produced an average radioactive carbon–14 mineral oil uptake value of 37.0 d.p.m. per milligram of fat and the above-indicated gas counting method resulted in an oil uptake value of 37.1 d.p.m. per milligram of pork fat.

*Example V*

The results of analysis obtained in this series of oleaginous plasticizer barrier coating experiments indicated that the methods used in applying the prime barrier coating (e.g. dipping, spraying or doctoring) and also the methods employed in applying the closely-adhering, continuous, organic, thermoplastic, resinous, packaging film (e.g. dipping in a hot-melt ethylcellulose coating composition) are optional. With this in mind, Table IV disregards these two factors. Whenever types and amounts of meat, body temperatures of the frozen meat, the type of resinous, exterior coating and other factors were similar, the results were averaged together for the summary Table IV shown below.

ing composition I of Example I. The composition of the second ethylcellulose coating material is as follows:

ETHYLCELLULOSE HOT-METAL COATING COMPOSITION II

| Ingredients: | Weight percent |
|---|---|
| Ethylcellulose (10 cps.) [1] | 37.50 |
| Mineral oil [2] | 49.85 |
| Butyl phthalyl butyl glycolate [3] | 6.58 |
| Acetyl tributyl citrate [4] | 4.62 |
| Epoxidized soyabean oil [5] | 1.30 |
| Citric acid (USP) | 0.14 |
| Butylated hydroxyanisole | 0.01 |

[1] "Ethocel," 10 c.p.s., standard.
[2] L. Sonneborn and Sons L–1 grade mineral oil.
[3] "Santicizer B–16."
[4] "Citroflex A–4."
[5] "Paraplex G–62."

When ethylcellulose hot-melt coating composition II was employed as the top coating material for this series of frozen meat samples, the results of A.O.A.C. modified method of mineral oil analysis as set forth in summary Table V hereinafter showed the leaching of the plasticizing additives into 30 percent fat beef patties (that had

TABLE IV.—SUMMARY

| Beef Type | Additive Materials in Barrier Coatings | Conc. of Additive Solids in Barrier Solution percent | Plasticizer Intake Through Barrier (p.p.m.) Hours Thaw at 75° F. | | | | Improvement by Barrier in Percent Per Thaw Time in Hours | |
|---|---|---|---|---|---|---|---|---|
| | | | 0.0 | 0.5 | 2.0 | 5.0 | 2.0 | 5.0 |
| Fat | Control (none) | None | 42 | 2,140 | 2,275 | | | |
| Do | Na/oleate | 0.1 | | | 550 | | 76.0 | |
| Do | Na/stearate | 0.1 | | | 430 | | 81.0 | |
| Do | Methylcellulose ethers (5,000 cps.) | 0.5 | | | 350 | | 84.8 | |
| Do | Corn starch | 1.0 | | | 485 | | 78.8 | |
| 30% fat | Control (none) | None | 190 | 281 | 660 | | | |
| Do | Comp. E [1] | 12 | | | | 318 | | 52.0 |
| Do | Comp. F [1] | 12 | | | | 305 | | 53.9 |

[1] Compositions E and F contain about 4.0 weight percent methylcellulose ethers having an average methoxyl content of between about 27.5 and 32.0 percent and an average viscosity of about 15 centipoises, about 8.0 weight percent of polyethylene glycol having an aveage molecular weight of either 9,000 (Composition E) or 12,000 (Composition F) and about 88.0 weight percent of water.

As recorded in summary Table IV, similar coating procedures were employed on ground meat patties having about a 30 percent content of fatty tissue.

The leaching of the oil plasticizer into the fat patties was reduced by more than 80 percent during a 2 hour period of thawing.

By applying a barrier coating composition (designated as composition E) onto 30 percent fat beef patties such composition having a solids content of about 12 weight percent and containing about 4.0 percent by weight of hydroxypropylmethylcellulose ether having an average viscosity of about 15 centipoises and an average methoxyl content of between about 27.5 and 32 percent, about 8.0 percent by weight of polyethylene glycol having an average molecular weight of about 12,000 and about 88 percent by weight of water, the leaching of oil plasticizer was reduced an additional 54 percent during a 5 hour thawing period over the barrierless control sample.

*Example VI*

Another series of frozen meat samples was prepared by applying to individual samples one of a variety of solidifiable edible barrier coating solutions and thereafter top coating the barrier-coated meat with an application of a hot-melt coating composition containing a higher concentration of ethylcellulose as compared with the hot-melt coat-been thawed at a temperature of about 75° F. for about 5 hours) was reduced approximately 53 percent over the amount of plasticizing ingredients leached by the fatty tissue from the ethylcellulose coating composition I. A five hour period of thawing of any frozen foodstuff and particularly meat at a temperature of about 75° F. is generally considered to be a severe thaw schedule for such purposes.

It was determined, by the same method of analysis, that by the employment of a barrier coating formed of a 4.0 percent tapioca starch-water solution and the same severe schedule of five hour thaw time at a temperature of about 75° F., the oil-plasticizer intake was reduced by about 69.0 percent. Under the above-described thawing conditions, a 4.0 percent corn starch-water solution barrier coating film reduced the oil-plasticizer intake by about 54.5 percent.

Solid barrier films were obtained by insolubilizing the barrier material, as shown in the cases of the sodium salt of carboxymethylcellulose and the propylene glycol partial ester of alginic acid by applying dilute (i.e. about 1 and 2 percent) aqueous solutions of calcium chloride over the surface of the prime barrier film. By this latter means, an insolubilized barrier film of the invention can be applied to the exposed surfaces of frozen fresh meat which is subsequently top coated with ethylcellulose hot-melt coating composition II. An increased reduction of the leaching of oleaginous additive substances from the solidified exterior resinous coating film into 30 percent fat beef patties (given 5 hour thaw at a temperature of about 75° F.) from approximately 300 parts per million to the beneficially lower amount of from about 50 to about 86 p.p.m. This was accomplished with an application of as little as 0.01 percent to 0.05 percent by weight of barrier film as based on the total weight of the frozen beef patty.

The oil-barrier film obtained by spray coating ground beef patties having a 30 percent by weight fat content with a 1.5 percent water solution of the propylene glycol partial ester of alginic acid and subsequently insolubilizing the barrier film thus formed with an overcoating of a 2 percent aqueous calcium chloride solution decreased by over 80 percent the leaching into the beef patties of the plasticizing components from the ethylcellulose exterior packaging film after a five hour thaw at 75° F.

The beneficial results of the application of other oil-barrier coating compositions is also shown hereinafter in summary Table V.

starch, and especially 1.5 percent aqueous solutions of pectinic acid amide, the sodium salt of carboxymethylcellulose. In addition, 1.5 percent aqueous solutions of the sodium salt of carboxymethylcellulose and the propylene glycol partial ester of alginic acid each barrier coating having an overcoating of a 1 or 2 percent aqueous calcium chloride solution, also provide very satisfactory oil-barrier coating films over frozen cuts of meat.

This invention can be further developed within the scope of the following attached claims and, accordingly, it is desired that the foregoing description be read as being merely illustrative of various operative embodiments of this invention.

What is claimed is:

1. A method of packaging a frozen meat product for the purpose of shielding the meat while thawing against adulteration from extractable oleaginous additive materials leached from organic, thermoplastic, resinous packaging films enveloping the same, said method comprising the steps: (1) freezing said meat product; (2) applying a prime, edible, barrier coating composition composed

TABLE V.—SUMMARY

| Beef Type | Additive Materials in Barrier Coatings | Conc. of Additive Solids in Barrier Solution (Percent) | Plasticizer Intake Through Barrier (p.p.m.) Thaw at 75° F., 5.0 Hrs. | Improvement by Barrier in Percent Per Thaw Time and Temperature After Thawing At 75° F., 5.0 Hrs. |
|---|---|---|---|---|
| 30% fat | Control (none) | None | 290 | |
| Do | Tapioca starch | 4.0 | 90 | 69.0 |
| Do | Corn starch | 4.0 | 132 | 54.5 |
| Do | Pectinic Acid Amide | 1.5 | 119 | 58.9 |
| Do | Na Salt of Carboxymethylcellulose | 1.5 | 53 | 81.7 |
| Do | Na Salt of Carboxymethylcellulose plus Calcium Chloride | 1.5 | | |
| | | 1.0 | 86 | 70.3 |
| Do | Hydroxyethylcellulose | 1.5 | <210 | 27.5 |
| Do | Methylcellulose Ether | 1.5 | 180 | 37.9 |
| Do | Propylene Glycol Partial Ester of Alginic Acid plus Calcium Chloride | 1.5 | | |
| | | 2.0 | 50 | 82.7 |

Therefore, it is shown that plasticizing additaments and particularly, oleaginous plasticizers, have the undesirable characteristic of leaching from organic, thermoplastic, resinous packaging film compositions (such as are currently employed to protectively envelop frozen cuts of meat and meat products) when held in intimate contact with the various surfaces of such meat and subsequently leave dissatisfactory accumulation of unnatural or foreign oleaginous material on the surfaces thereof. In addition, the presence of a normal and desirable distribution of fatty tissue as would appear on the surface of meat in general tends to enhance the migration of the leached oils by absorbing the plasticizing additaments and, in turn, over-plasticizing the packaging film, particularly at temperatures above freezing (i.e. during the thaw period). Advantageously, the presence of a continuous, adhering film of one of the various solidifiable, edible barrier coating materials of the invention disposed between the exterior thermoplastic, resinous, packaging film (containing oleaginous plasticizers) and the fat tissue of the meat appreciably reduces the amount of such plasticizing materials that migrate onto and permeate the meat. The various water-soluble, solidifiable, edible substances and compositions employed in the frozen meat packaging method of the present invention which maintain a continuous barrier film at room temperatures when in direct intimate contact with the many irregular surfaces of frozen meat in the process of thawing, that is, while the meat is enveloped in a plastified, closely adhering, organic, thermoplastic, resinous film are satisfactory as packaging film-plasticizer barrier coating materials. The most effective barrier coatings for meats consist of aqueous solutions of edible materials that form a continuous, transparent, solid film, such as are obtained by aqueous solutions of hydroxypropylmethylcellulose ethers, corn starch, tapioca essentially of an aqueous solution of an edible barrier material selected from the group of materials consisting of (a) tapioca starch, (b) corn starch, (c) sodium oleate, (d) sodium stearate, (e) hydroxypropylmethylcellulose ether having an average methoxyl content within the range of from 27 to 29 percent and an average hydroxypropoxyl content within the range of from 4 to 7.5 percent, (f) hydroxypropylmethylcellulose ether having an average methoxyl content within the range of from 19 to 24 percent and an average hydroxypropoxyl content within the range of from 4 to 12 percent, (g) mixtures of e and f, (h) pectinic acid amide having an average methoxyl content of from 3.5 to 5.0 percent, (i) sodium salt of carboxymethylcellulose having a degree of cellulose hydroxyl substitution of from 0.65 to 0.95 and a viscosity as a 2 percent aqueous solution at 20° C. of from 300 to 600 centipoises, as a thin, continuous coating of from 3 to 10 mils covering the exposed surfaces of the frozen meat product, said barrier coating composition being solidifiable at the temperature of the surface of said frozen meat product at the time of application thereon; (3) solidifying said continuous coating; and (4) enveloping the frozen, barrier-coated meat product in an outer casing of a packaging composition for frozen meat products consisting of a suitably adherent, moisture-impervious, protective, organic, thermoplastic, resinous packaging film having the principal film-forming component thereof selected from the group consisting of ethylcellulose, polyvinyl chloride, Saran, cellulose acetate, cellulose acetate butyrate, polyethylene and polypropylene.

2. The method of claim 1, wherein said prime, edible barrier coating composition is a water-soluble solidifiable coating composition composed of about 1 to 2 parts of a mixture of hydroxypropylmethylcellulose ether having an average methoxyl content of from 19 to 24 percent and an average hydroxypropoxyl content of from 4 to 12 percent and hydroxypropylmethylcellulose ether having a methoxyl content of from 27 to 29 percent, an average hydroxypropoxyl content of from 4 to 7.5 percent and a viscosity of about 400 centipoises as measured on a 2.0 percent aqueous solution at a temperature of 20° C., about 20 parts of hydroxypropylsurcrose monopalmitate, about 7 to 8 parts of hydroxypropylsucrose and from about 60 to 80 parts of water.

3. The method of claim 1, wherein said prime, edible barrier coating composition is a water-soluble, solidifiable coating composition composed of about 4.0 weight percent of methylcellulose ether having a methoxyl content of from 27.5 to 32 percent and an average viscosity of about 15 centipoises as measured on a 2.0 percent aqueous solution at a temperature of 20° C., about 8.0 weight percent of polyethylene glycol having an average molecular weight of about 9000 and about 88.0 weight percent water.

4. The method of claim 1, wherein said prime, edible barrier coating composition is a water-soluble, solidifiable coating composition composed of about 4.0 weight percent of methylcellulose ether having a methoxyl content of from 27.5 to 32.0 percent and an average viscosity of about 15 centipoises as measured on a 2.0 percent aqueous solution at a temperature of 20° C., about 8.0 weight percent of polyethylene glycol having an average molecular weight of about 12,000 and about 88.0 weight percent water.

5. The method of claim 1, wherein said prime, edible barrier coating composition is a solidified coating composition composed of the film of about a 1.5 weight percent solids in water of an aqueous solution of the sodium salt of carboxymethylcellulose having a degree of cellulose hydroxy substitution of from 0.65 to 0.95 and a viscosity as a 2 percent aqueous solution at 25° C. of from 300 to 600 centipoises, the solidified coating being overcoated with the film formed of an aqueous solution of about a 1.0 weight percent concentration in water of calcium chloride.

6. The method of claim 1, wherein said prime, edible barrier coating composition is a solidified coating composition composed of the film formed of about a 1.5 weight percent solids in water of an aqueous solution of the propylene glycol partial ester of alginic acid having a viscosity as a 3 percent aqueous solution at 25° C. of about 6000 centipoises, the solidified coating being overcoated with the film formed of an aqueous solution of about a 2.0 weight percent concentration in water of calcium chloride.

7. The method of claim 1, wherein said prime, edible barrier coating composition is applied to said frozen meat product while maintaining said barrier coating composition at a temperature within the range of between about 20° C. and about 60° C.

8. The method of claim 1, wherein said frozen meat product of step 1 is frozen to a temperature below −20° C.

9. The method of claim 1, wherein the barrier coated frozen meat product of step 2 is refrozen and maintained at a temperature below −30° C. prior to said enveloping process of step 4.

References Cited by the Examiner
UNITED STATES PATENTS
3,061,446   10/1946   Norman et al. _____ 99—174

A. LOUIS MONACELL, *Primary Examiner.*